United States Patent
Kawai

(10) Patent No.: US 9,021,567 B2
(45) Date of Patent: Apr. 28, 2015

(54) PRINTING SYSTEM AND METHOD TO REGISTER CARD ID

(71) Applicant: Kyocera Document Solutions Inc., Osaka (JP)

(72) Inventor: Takanao Kawai, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 40 days.

(21) Appl. No.: 13/951,106

(22) Filed: Jul. 25, 2013

(65) Prior Publication Data

US 2014/0033287 A1   Jan. 30, 2014

(30) Foreign Application Priority Data

Jul. 30, 2012   (JP) ................................ 2012-167936

(51) Int. Cl.
| | |
|---|---|
| G06F 21/31 | (2013.01) |
| H04L 29/06 | (2006.01) |
| H04N 1/00 | (2006.01) |
| H04N 1/32 | (2006.01) |
| H04N 1/44 | (2006.01) |

(52) U.S. Cl.
CPC ...... *H04L 63/083* (2013.01); *H04N 2201/3204* (2013.01); *H04N 1/00244* (2013.01); *H04N 1/00326* (2013.01); *H04N 1/32106* (2013.01); *H04N 1/4413* (2013.01); *H04N 1/4433* (2013.01); *H04N 2201/0094* (2013.01); *H04N 2201/3278* (2013.01); *H04N 2201/3205* (2013.01)

(58) Field of Classification Search
CPC ..... H04L 63/08; H04L 63/20; H04L 63/0831; G06F 21/31
USPC ............................................................ 726/7
See application file for complete search history.

(56) References Cited

U.S. PATENT DOCUMENTS

| | | | | |
|---|---|---|---|---|
| 2008/0178265 | A1* | 7/2008 | Tsuchiya et al. ................. | 726/3 |
| 2008/0189775 | A1 | 8/2008 | Fujita | |
| 2011/0197271 | A1* | 8/2011 | Buck ................................ | 726/9 |

FOREIGN PATENT DOCUMENTS

JP   2012-084032   4/2012

* cited by examiner

*Primary Examiner* — Teshome Hailu
*Assistant Examiner* — Thanh Le
(74) *Attorney, Agent, or Firm* — K&L Gates LLP

(57) ABSTRACT

A printing system includes an image forming apparatus and a management server connected via a network. The image forming apparatus reads a card ID of a user of the image forming apparatus from the ID card, accepts non-card authentication information, transmits an authentication request, including the card ID, to the management server, and, if an unsuccessful authentication result is transmitted from the management server, transmits a card registration request, including the non-card authentication information, to the management server. The management server transmits a successful authentication result or the unsuccessful authentication result to the image forming apparatus according to whether the card ID has been registered in correspondence to the user, registers the non-card authentication information in correspondence to the user, and if the non-card authentication information has been registered in correspondence to the user, registers the card ID in correspondence to the user.

4 Claims, 8 Drawing Sheets

| USER ID | PASSWORD | CARD ID | AUTHORITY | ... | UPDATED DATE AND TIME OF USER INFORMATION |
|---|---|---|---|---|---|
| USER001 | 1234 | 1234567890 | COPY SEND | ... | 7/31/2012 12:00 |
| USER002 | 0987 | 0987654321 | SEND | ... | 7/30/2012 16:50 |
| ... | ... | ... | ... | ... | ... |

34B USER INFORMATION

Fig. 4

PRINTING SYSTEM AND METHOD TO REGISTER CARD ID

INCORPORATION BY REFERENCE

This application is based upon, and claims the benefit of priority from, corresponding Japanese Patent Application No. 2012-167936, filed in the Japan Patent Office on Jul. 30, 2012, the entire contents of which are incorporated herein by reference.

FIELD

The present disclosure relates to a printing system that includes an image forming apparatus in which a card ID has been registered that corresponds to a user, and also includes a management server that manages the user of the image forming apparatus. Additionally, the present disclosure relates to a method of registering the card ID used by the printing system.

BACKGROUND

In a typical image forming apparatus, a card ID, which is information that identifies an ID card, has been registered in advance in correspondence to a user; if the card ID read from the ID card has been registered, a notification of successful authentication of the user is transmitted.

To use the ID card for authentication, the above-described typical image forming apparatus requires registering the card ID in correspondence to the user. This task must be manually carried out by, for example, a manager, so a lengthy time is taken until authentication with the ID card becomes possible.

SUMMARY

The present disclosure relates to a printing system and method that shortens the time taken until authentication with an ID card becomes possible.

A printing system according to an embodiment of the present disclosure includes an image forming apparatus and a management server that are connected via a network.

The image forming apparatus includes: i) a card reader configured to read a card ID from an ID card of a user using the image forming apparatus; ii) a non-card authentication information accepting device configured to accept non-card authentication information; iii) an authentication requesting unit configured to transmit an authentication request including the card ID of the user to the management server; and iv) a registration requesting unit configured to transmit a card registration request including the non-card authentication information to the management server, if an unsuccessful authentication result that includes information indicating that the card ID has not been registered is transmitted from the management server.

The management server includes: i) an authentication executing unit configured to transmit a successful authentication result to the image forming apparatus, if the card ID received from the image forming apparatus has been registered in correspondence to the user, and transmit the unsuccessful authentication result to the image forming apparatus, if the card ID has not been registered in correspondence to the user; ii) a non-card authentication information registering unit configured to register the non-card authentication information in correspondence to the user; and iii) a card ID registering unit configured to register the card ID in correspondence to the user, if the non-card authentication information included in the card registration request received from the image forming apparatus has been registered in correspondence to the user.

A card ID registration method according to an embodiment of the present disclosure is performed by a printing system including an image forming apparatus and a management server that are connected via a network.

The method includes: via the image forming apparatus, i) reading a card ID from an ID card of a user using the image forming apparatus; ii) accepting non-card authentication information; iii) transmitting an authentication request including the card ID of the user to the management server; and iv) transmitting a card registration request including the non-card authentication information to the management server, if an unsuccessful authentication result that includes information indicating that the card ID has not been registered is transmitted from the management server.

The method further includes: via the management server, i) transmitting a successful authentication result to the image forming apparatus, if the card ID received from the image forming apparatus has been registered in correspondence to the user; ii) transmitting the unsuccessful authentication result to the image forming apparatus, if the card ID has not been registered that corresponds to the user; iii) registering the non-card authentication information in correspondence to the user; and iv) registering the card ID included in the card registration request in correspondence to the user, if the non-card authentication information included in the card registration request received from the image forming apparatus has been registered in correspondence to the user.

Additional features and advantages are described herein, and will be apparent from the following Detailed Description and the figures.

BRIEF DESCRIPTION OF THE FIGURES

In the accompanying drawings:

FIG. 4 is a schematic diagram illustrating an example of user information stored in the management server;

DETAILED DESCRIPTION

Figure 1:
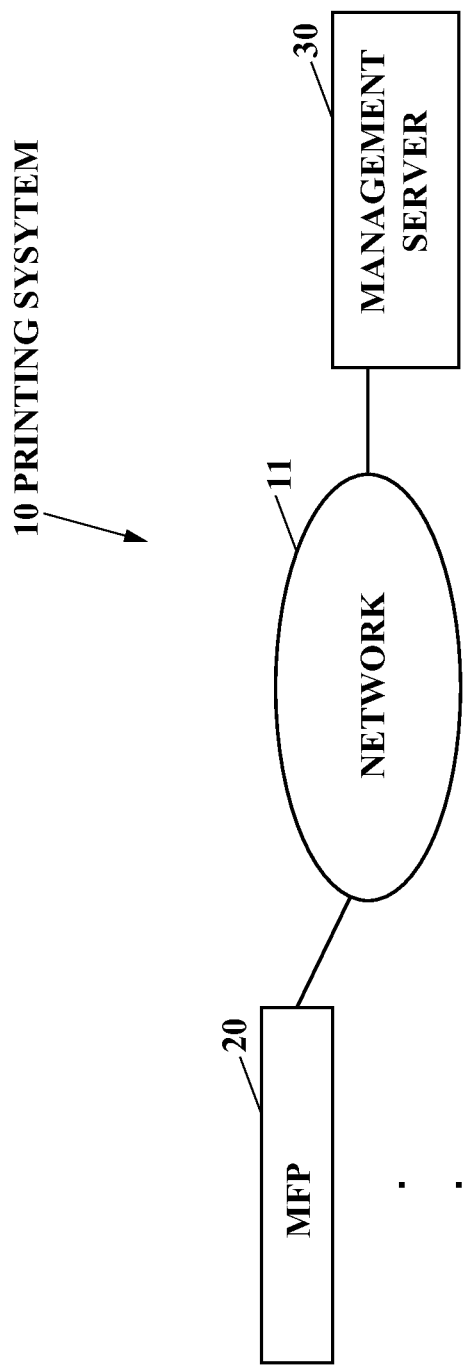
FIG. 1 is a block diagram illustrating a configuration of a printing system of an embodiment of the present disclosure.

FIG. 1 is a block diagram illustrating a configuration of a printing system 10 in an embodiment of the present disclosure.

As illustrated in FIG. 1, the printing system 10 has a plurality of multi-function peripherals (MFPs) including a MFP 20 and also has a management server 30 that manages the users of the MFPs. The plurality of MFPs and the management server 30 are interconnected via a network 11 such as, for example, a local area network (LAN) or the Internet so that they can communicate. The plurality of MFPs are each a constituent component of the image forming apparatus in the embodiment of the present disclosure.

Each of the plurality of MFPs included in the printing system 10 has the same configuration as the MFP 20. In the description below, therefore, the MFP 20 will typify the plurality MFPs included in the printing system 10 and only the MFP 20 will be discussed.

Figure 2:
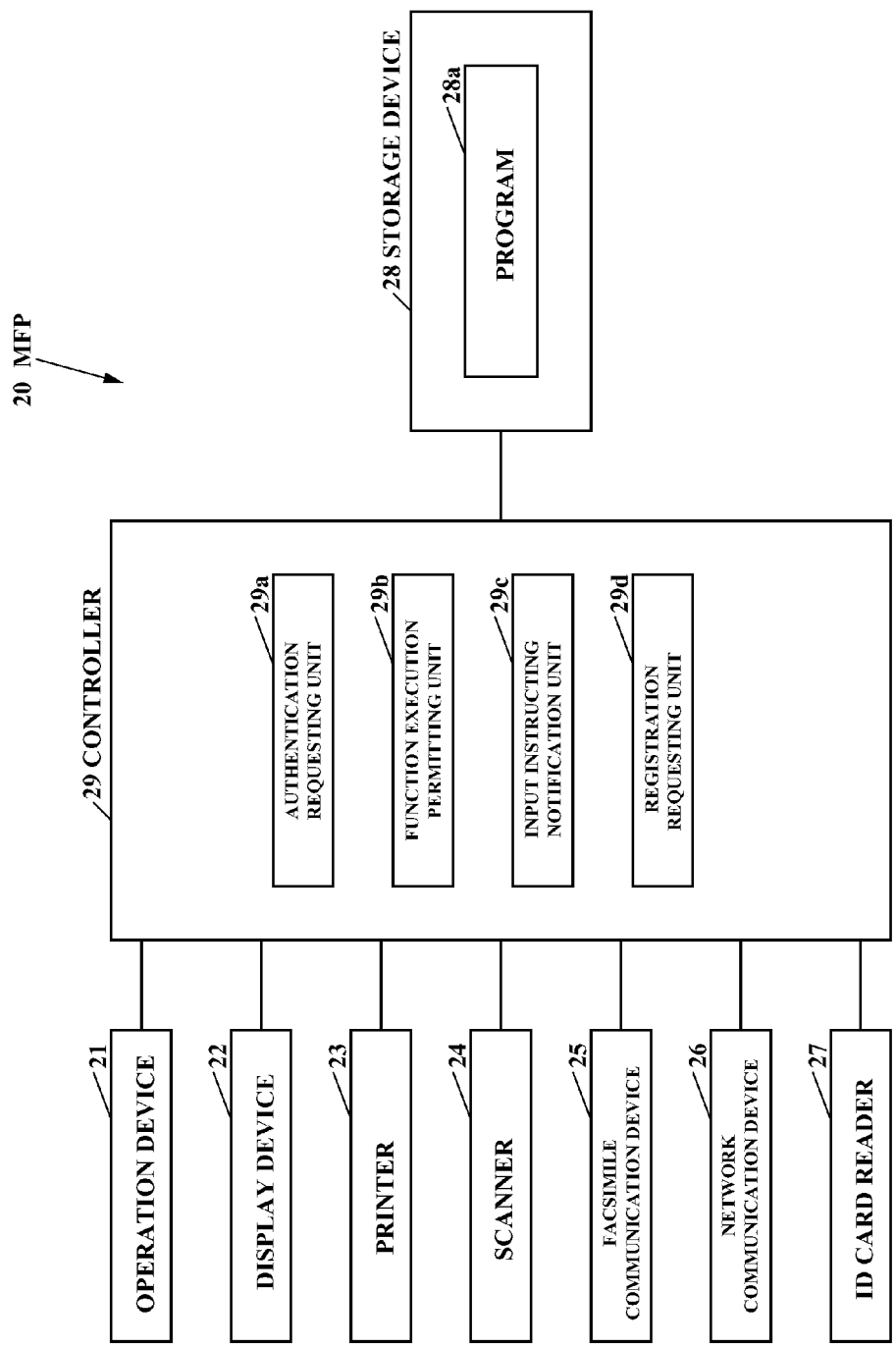
FIG. 2 is a block diagram illustrating a configuration of a multi-function peripheral (MFP) in the printing system.

FIG. 2 is a block diagram illustrating a configuration of the MFP 20.

As illustrated in FIG. 2, the MFP 20 includes: i) a operation device 21, which is an input device that has, for example, buttons that are used by the user to enter various operation inputs; ii) a display device 22 such as, for example, a liquid crystal display (LCD) unit on which various types of information are displayed; iii) a printer 23, which is a printing device that performs printing on paper; iv) a scanner 24, which is a read device that reads an image from a draft; v) a facsimile communication device 25, which is a facsimile device that performs facsimile communication with an external facsimile device (not illustrated) via a communication line such as a public telephone line; vi) a network communication device 26 that communicates with an external device via a network 11 (see FIG. 1); vii) an ID card reader 27, which is a card reader that reads a card ID, which is identification information on an ID card, from the ID card; viii) a storage device 28 such as, for example, an electrically erasable programmable read-only memory (EEPROM), which stores various types of data; and ix) a controller 29 that controls the entire MFP 20.

An example of the ID card is an integrated circuit (IC) card.

The operation device 21 accepts information in which a user ID, which is identification information on the user, and a password are combined, as non-card authentication information, which is authentication information on the user other than the card ID. The operation device 21 is configured as the non-card authentication information accepting device in the present disclosure.

The storage device 28 stores a program 28a, which is intended to be executed by the MFP 20.

The program 28a may have been installed in the MFP 20 when the MFP 20 was manufactured. Alternatively, the program 28a may be installed in the MFP 20 from a secure digital (SD) card, a universal serial bus (USB) memory, or another type of storage medium or via the network 11.

The controller 29 includes, for example, a central processing unit (CPU), a read-only memory (ROM) in which programs and various types of data have been stored in advance, and a random-access memory (RAM) used by the CPU as a working area. The CPU executes programs stored in the ROM or storage device 28.

The controller 29 executes the program 28a to function as: i) an authentication requesting unit 29a that transmits an authentication request, which requires the user to be authenticated, to the management server 30; ii) a function execution permitting unit 29b that permits execution of a function under an authority included in an authentication result that is transmitted from the management server 30 to indicate successful authentication of the user; iii) an input instructing notification unit 29c that notifies the user of a instruction to enter non-card authentication information when a notification of non-registration of the card ID is received from the management server 30; and iv) a registration requesting unit 29d that transmits a card registration request, which requires the card ID to be registered, to the management server 30 when the notification of non-registration of the card ID is received from the management server 30.

Figure 3:
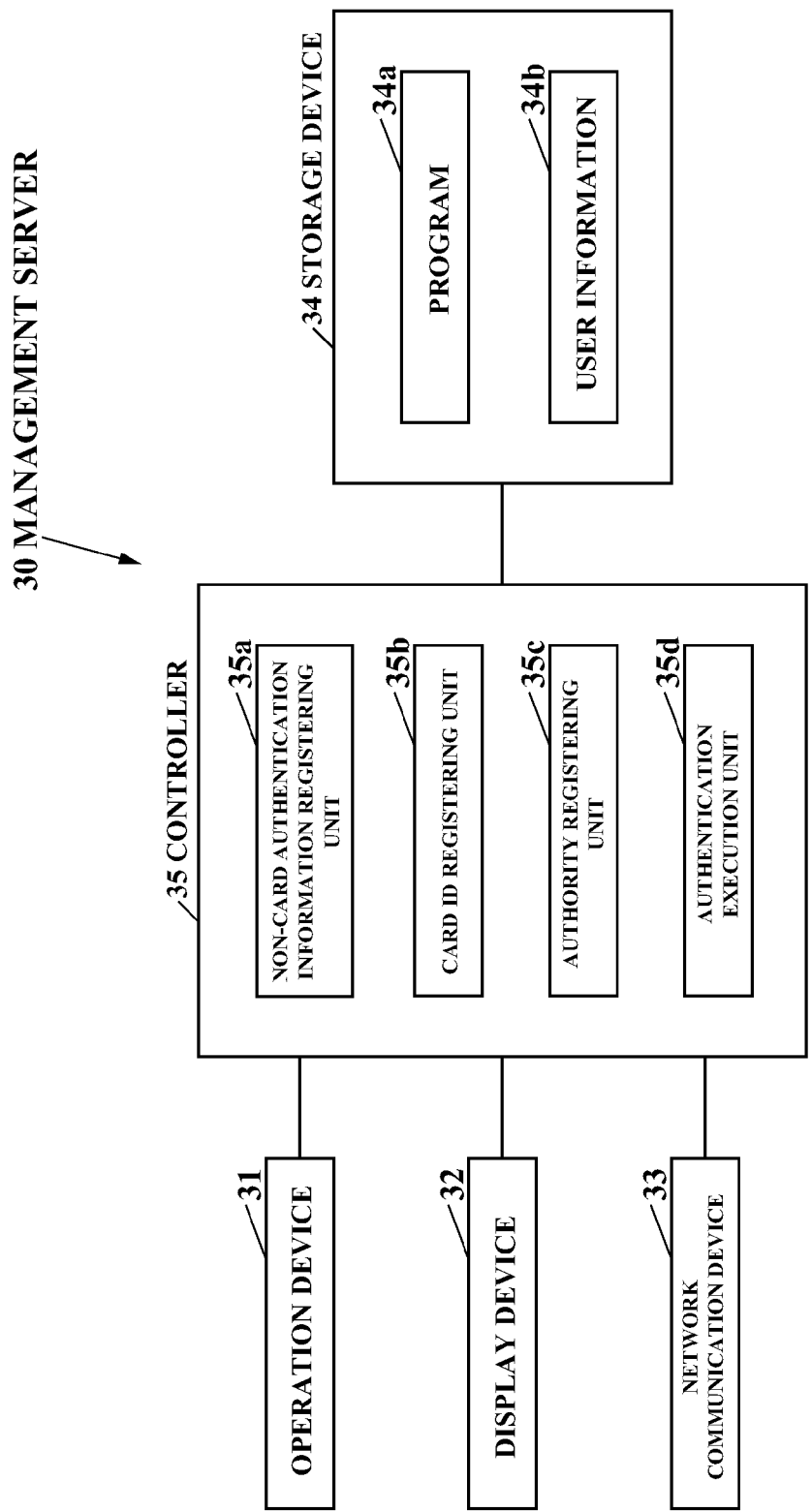
FIG. 3 is a block diagram illustrating a configuration of a management server in the printing system.

FIG. 3 is a block diagram illustrating a configuration of the management server 30.

As illustrated in FIG. 3, the management server 30 includes: i) an operation device 31, which is an input device that has, for examples, a mouse and a keyboard used to enter various operation inputs; ii) a display device 32 such as, for example, an LCD unit on which various types of information are displayed; iii) a network communication device 33 that communicates with an external device via the network 11 (see FIG. 1); iv) a storage device 34 such as, for example, a hard disk drive (HDD), which stores programs and various types of data; and v) a controller 35 that controls the entire management server 30. The management server 30 is, for example, a personal computer (PC) or another computer.

The storage device 34 stores a program 34a, which is used by the management server 30, and user information 34b used when user information, which is information related to the user, is authenticated.

The program 34a may have been installed in the management server 30 when the management server 30 was manufactured. Alternatively, the program 34a may be installed in the management server 30 from a compact disk (CD), a digital versatile disk (DVD), or another type of storage medium or via the network 11.

FIG. 4 is a schematic diagram illustrating an example of the user information 34b.

As illustrated in FIG. 4, the user information 34b is user-specific information, which includes, for each user, the user ID, the password, the card ID, authorities for MFP function execution, and an updated date and time of the user information.

In the user information 34b illustrated in FIG. 4, the password of the user specified by the user ID of USER001 is 1234, the card ID of the user is 1234567890, the authorities of the user are "COPY", which permits an image read from a draft by, for example, the scanner 24 to be printed by the printer 23 and "SEND", which permits the image read from the draft by the scanner 24 to be transmitted by the network communication device 33, and the updated date and time of the user information is Jul. 31, 2012 12:00.

The controller 35 illustrated in FIG. 3 includes the CPU, the ROM in which programs and various types of data have been stored in advance, and the RAM used by the CPU as the working area. The CPU executes programs stored in the ROM or the storage device 34.

The controller 35 executes the program 34a stored in the storage device 34 to function as: i) a non-card authentication information registering unit 35a that registers the non-card authentication information in correspondence to the user; ii) a card ID registering unit 35b that registers the card ID in correspondence to the user; iii) an authority registering unit 35c that registers authority for MFP function execution in correspondence to the user; and iv) an authentication execution unit 35d that executes user authentication and transmits an authentication result to the MFP.

Next, an operation of the printing system 10 will be described.

How information is registered in the user information 34b stored in the storage device 34 included in the management server 30 will be described.

The manager can instruct, from the operation device 31, the management server 30 to register a combination of the user ID and the password, that is, the non-card authentication information, in the user information 34b. When the registration of the non-card authentication information in the user information 34b is instructed, the non-card authentication information registering unit 35a in the management server 30 registers the non-card authentication information in the user information 34b in correspondence to the relevant user. When, for example, the combination of the user ID of USER001 and the password of 1234 is instructed to be registered in the user information 34b as the non-card authentication information, the non-card authentication information registering unit 35a registers the non-card authentication information in the user information 34b in correspondence to the user with the user ID USER001.

The manager can also instruct, from the operation device 31, the management server 30 to register the card ID in the user information 34b. When the registration of the card ID in the user information 34b is instructed, the card ID registering unit 35b in the management server 30 registers the card ID in the user information 34b in correspondence to the relevant user. When, for example, the card ID of 1234567890 is instructed to be registered in the user information 34b for the user ID of USER001, the card ID registering unit 35b registers the card ID 1234567890 in the user information 34b in correspondence to the user with the user ID USER001.

The manager can also instruct, from the operation device 31, the management server 30 to register the authority for MFP function execution in the user information 34b. If the registration of authority for MFP function execution in the user information 34b is instructed, the authority registering unit 35c in the management server 30 registers the authorities in the user information 34b in correspondence to the relevant user. When, for example, "COPY", "SEND", and other authorities for MFP function execution are instructed to be registered in the user information 34b for the user ID of USER001, the authority registering unit 35c registers "SEND", "COPY", and the other authorities for MFP function execution in the user information 34b in correspondence to the user with the user ID USER001.

Next, another operation of the printing system 10 will be described, assuming that the user has entered the user ID and the password of the user into the operation device 21 to log in to the MFP 20.

Figure 5:
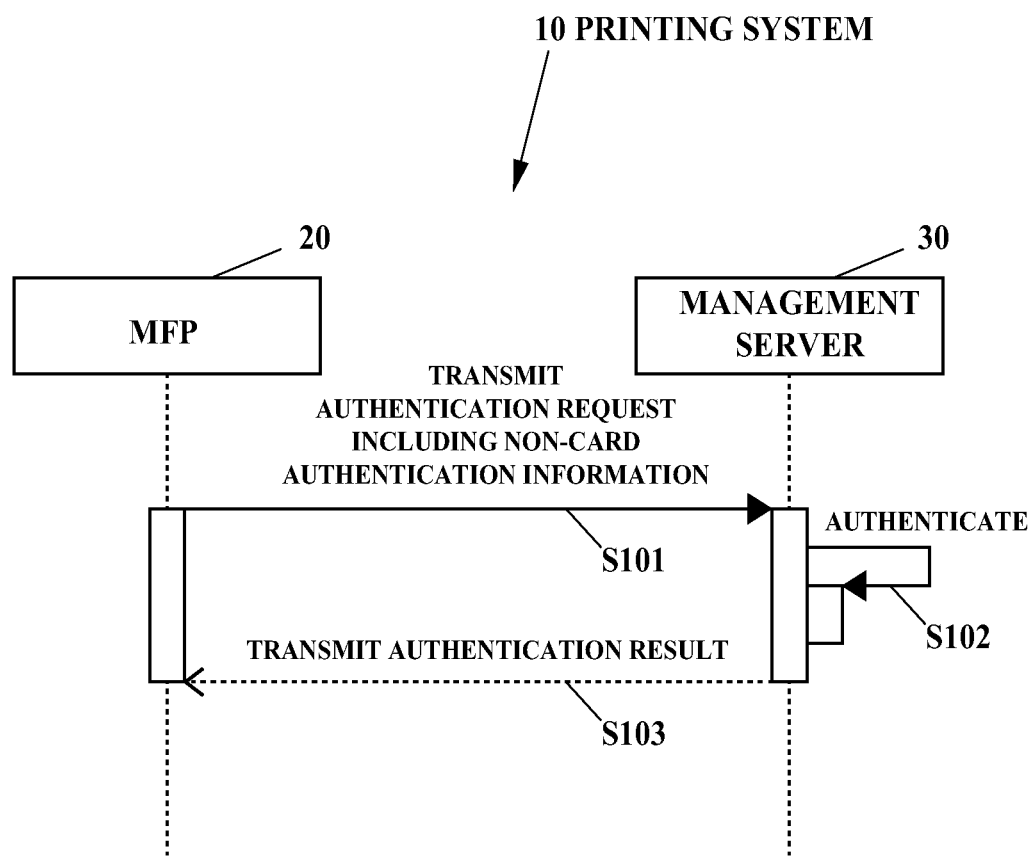
FIG. 5 is a sequence diagram illustrating an example of an operation performed by the printing system.

FIG. 5 is a sequence diagram illustrating an example of an operation performed by the printing system 10 when the user has entered the user ID and the password into the operation device 21 to log in to the MFP 20.

When the user has entered the combination of the user ID and the password, that is, the non-card authentication information, into the operation device 21 to log in to the MFP 20, the controller 29 in the MFP 20 executes the operation illustrated in FIG. 5.

As illustrated in FIG. 5, the authentication requesting unit 29a in the MFP 20 transmits an authentication request including the non-card authentication information accepted by the operation device 21 to the management server 30 via the network communication device 26 (S101).

The authentication execution unit 35d in the management server 30 receives the authentication request, which has been transmitted from the MFP 20, via the network communication device 33, and authenticates according to the authentication request (S102). If the non-card authentication information included in the authentication request has been registered in the user information 34b in the storage device 34 in correspondence to the user, the authentication execution unit 35d decides that authentication of the user has succeeded. If, for example, the user ID and the password in the non-card authentication information included in the authentication request is respectively USER001 and 1234 and the user information 34b in the storage device 34 is as illustrated in FIG. 4, since the non-card authentication information included in the authentication request has been registered in the user information 34b in the storage device 34 in correspondence to the user with user ID USER001, the authentication execution unit 35d decides that the user has been successfully authenticated. If the non-card authentication information included in the authentication request has not been registered in the user information 34b in correspondence to the user, the authentication execution unit 35d decides that the user has been unsuccessfully authenticated.

Next, the authentication execution unit 35d transmits an authentication result obtained in S102 via the network communication device 33 to the MFP 20 (S103). If authentication in S102 has succeeded, the authentication execution unit 35d includes, in the authentication result, the information indicating the successful authentication of the user and the authority registered in the user information 34b in the storage device 34 in correspondence to the user. If, for example, a user with the user ID of USER001 has been successfully authenticated in S102, the authentication execution unit 35d includes, in the authentication result, the information indicating the successful authentication of the user with the user ID USER001 and the authority such as, for example, "COPY" and "SEND" registered in the user information 34b in correspondence to the user. If the authentication in S102 has failed, the authentication execution unit 35d includes, in the authentication result, the information indicating the unsuccessful authentication of the user.

If the function execution permitting unit 29b included in the controller 29 in the MFP 20 receives the authentication result that includes the information indicating the successful authentication of the user, the function execution permitting unit 29b permits the function execution under the authority included in the authentication result until the user logs out. If, for example, the authority included in the authentication result includes "COPY", the function execution permitting unit 29b executes the copy operation in response to the copy instruction transmitted by the user from the operation device 21.

If the function execution permitting unit 29b receives the authentication result that includes the information indicating the unsuccessful authentication of the user, the function execution permitting unit 29b does not permit the execution of the function of the MFP 20.

Next, another operation of the printing system 10 will be described, assuming that the user holds the ID card that has been registered in the management server 30 over the ID card reader 27 of the MFP 20 to log in to the MFP 20.

Figure 6:
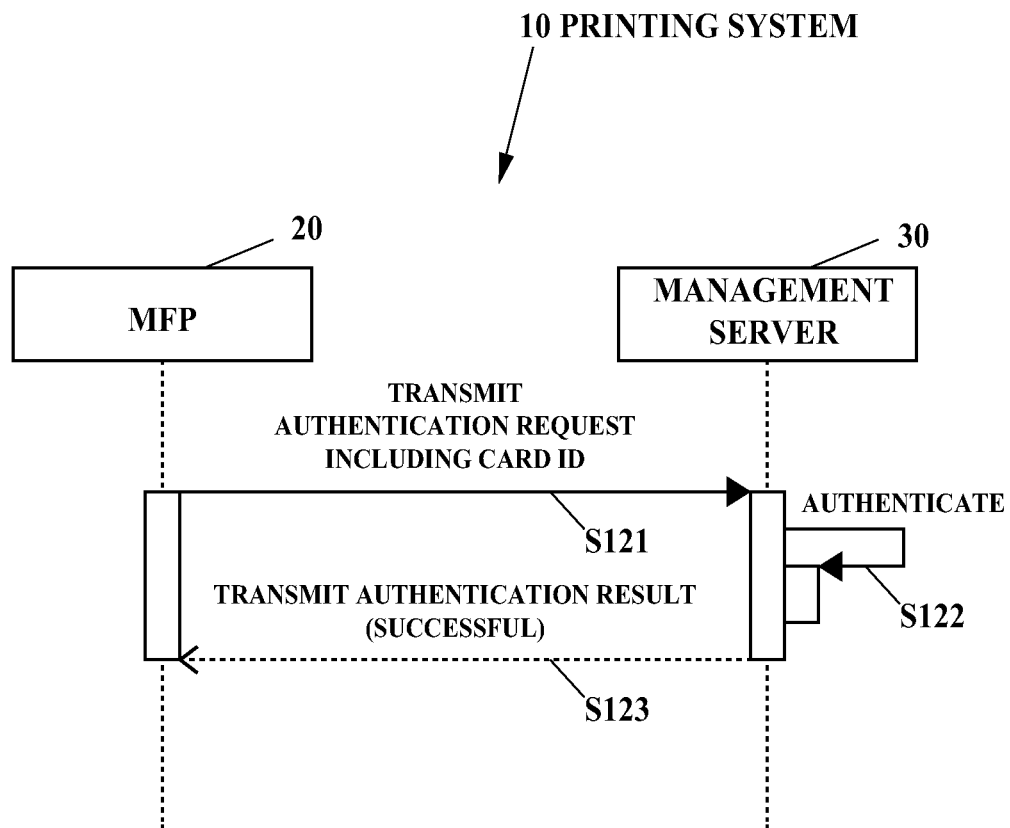
FIG. 6 is a sequence diagram illustrating another example of an operation performed by the printing system.

FIG. 6 is a sequence diagram illustrating an operation of the printing system 10 when the user holds an ID card that has been registered in the management server 30 over the ID card reader 27 of the MFP 20 to log in to the MFP 20.

When the user holds an ID card that has been registered in the management server 30 over the ID card reader 27 of the MFP 20 to log in to the MFP 20, the controller 29 in the MFP 20 operates as illustrated in FIG. 6.

As illustrated in FIG. 6, the authentication requesting unit 29a included in the controller 29 in the MFP 20 transmits, via the network communication device 26 to the management server 30, an authentication request including the card ID read by the ID card reader 27 (S121).

The authentication execution unit 35d included in the controller 35 in the management server 30 receives the authentication request from the MFP 20 via the network communication device 33, and authenticates according to the received authentication request (S122). Since the card ID included in the authentication request has been registered in the user information 34b in the storage device 34 in correspondence to the user, the authentication execution unit 35d decides that the user has been successfully authenticated. If, for example, the card ID included in the authentication request is 1234567890 and the user information 34b in the storage device 34 is as illustrated in FIG. 4, since the card ID included in the authentication request has been registered in the user information 34b in correspondence to the user with user ID USER001, the authentication execution unit 35d decides that the user has been successfully authenticated.

Next, the authentication execution unit 35d transmits the authentication result obtained in S122 via the network communication device 33 to the MFP 20 (S123). Since authentication in S122 has been successful, the authentication execution unit 35d includes, in the authentication result, the information indicating the successful authentication of the user and authority registered in the user information 34b in correspondence to the user. If, for example, the user with the user ID of USER001 has been successfully authenticated in S122, the authentication execution unit 35d includes, in the authentication result, the information indicating the successful authentication of the user with the user ID USER001 and authorities such as, for example, "COPY" and "SEND" registered in the user information 34b in correspondence to the user.

If the function execution permitting unit 29b included in the controller 29 in the MFP 20 receives, via the network communication device 26, the authentication result that includes the information indicating the successful authentication of the user, the function execution permitting unit 29b permits the function execution under the authority included in the authentication result until the user logs out. If, for example, the authority included in the authentication result includes "COPY", the function execution permitting unit 29b executes a copying operation in response to the copy instruction transmitted by the user from the operation device 21.

Next, another operation of the printing system 10 will be described, assuming that the user holds an ID card that has not been registered in the management server 30 over the ID card reader 27 of the MFP 20 to log in to the MFP 20. The user obtains an ID card that is not registered in the management server 30 from, for example, the manager.

Figure 7:
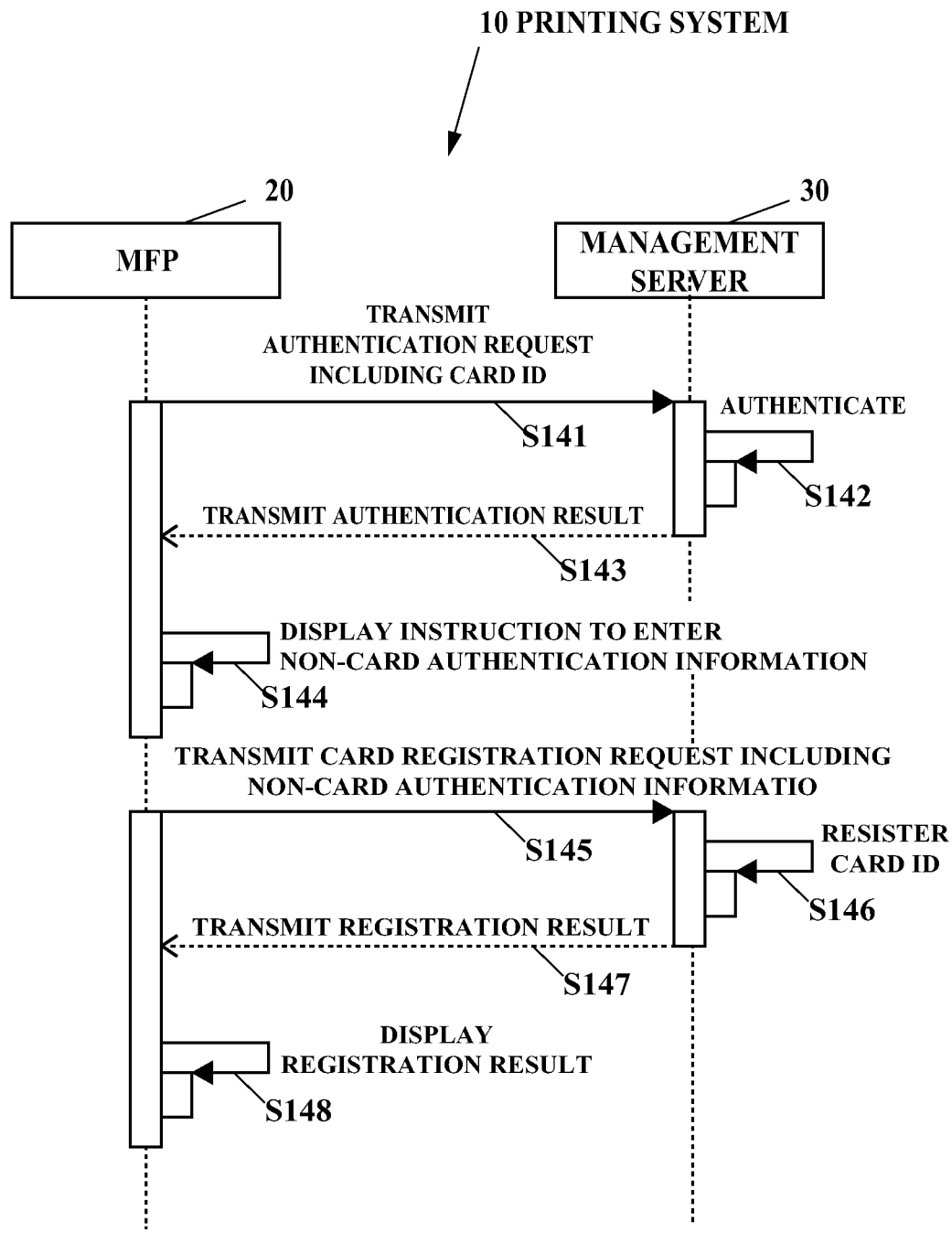
FIG. 7 is a sequence diagram illustrating yet another example of an operation performed by the printing system.

FIG. 7 is a sequence diagram illustrating an operation of the printing system 10 when the user holds an ID card that has not been registered in the management server 30 over the ID card reader 27 of the MFP 20 to log in to the MFP 20.

When the user holds an ID card that has not been registered in the management server 30 over the ID card reader 27 of the MFP 20 to log in to the MFP 20, the controller 29 in the MFP 20 operates as illustrated in FIG. 7.

As illustrated in FIG. 7, the authentication requesting unit 29a in the MFP 20 transmits, via the network communication device 26 to the management server 30, the authentication request including the card ID read by the ID card reader 27 (S141).

The authentication execution unit 35d in the management server 30 receives the authentication request from the MFP 20 via the network communication device 33, and authenticates according to the received authentication request (S142). Since the card ID included in the authentication request has not been registered in the user information 34b in the storage device 34 in correspondence to the user, the authentication execution unit 35d decides that the user has been unsuccessfully authenticated.

Next, the authentication execution unit 35d transmits the authentication result obtained in S142 via the network communication device 33 to the MFP 20 (S143). Since the authentication in S142 has failed, the authentication execution unit 35d includes, in the authentication result, the information indicating the unsuccessful authentication of the user and information indicating that the card ID used in authentication in S142 has not been registered.

The input instructing notification unit 29c in the MFP 20 receives the authentication result transmitted from the management server 30 via the network communication device 26. Since the authentication result received from the management server 30 via the network communication device 26 includes the information indicating that the card ID has not been registered, the input instructing notification unit 29c displays, on the display device 22, the instruction to enter the combination of the user ID and the password, that is, the non-card authentication information, as illustrated in FIG. 8, to notify the user (S144).

Incidentally, when receiving of the authentication result indicating the unsuccessful authentication of the user via the network communication device 26, the function execution permitting unit 29b included in the controller 29 in the MFP 20 does not permit the execution of the function of the MFP 20.

Figure 8:
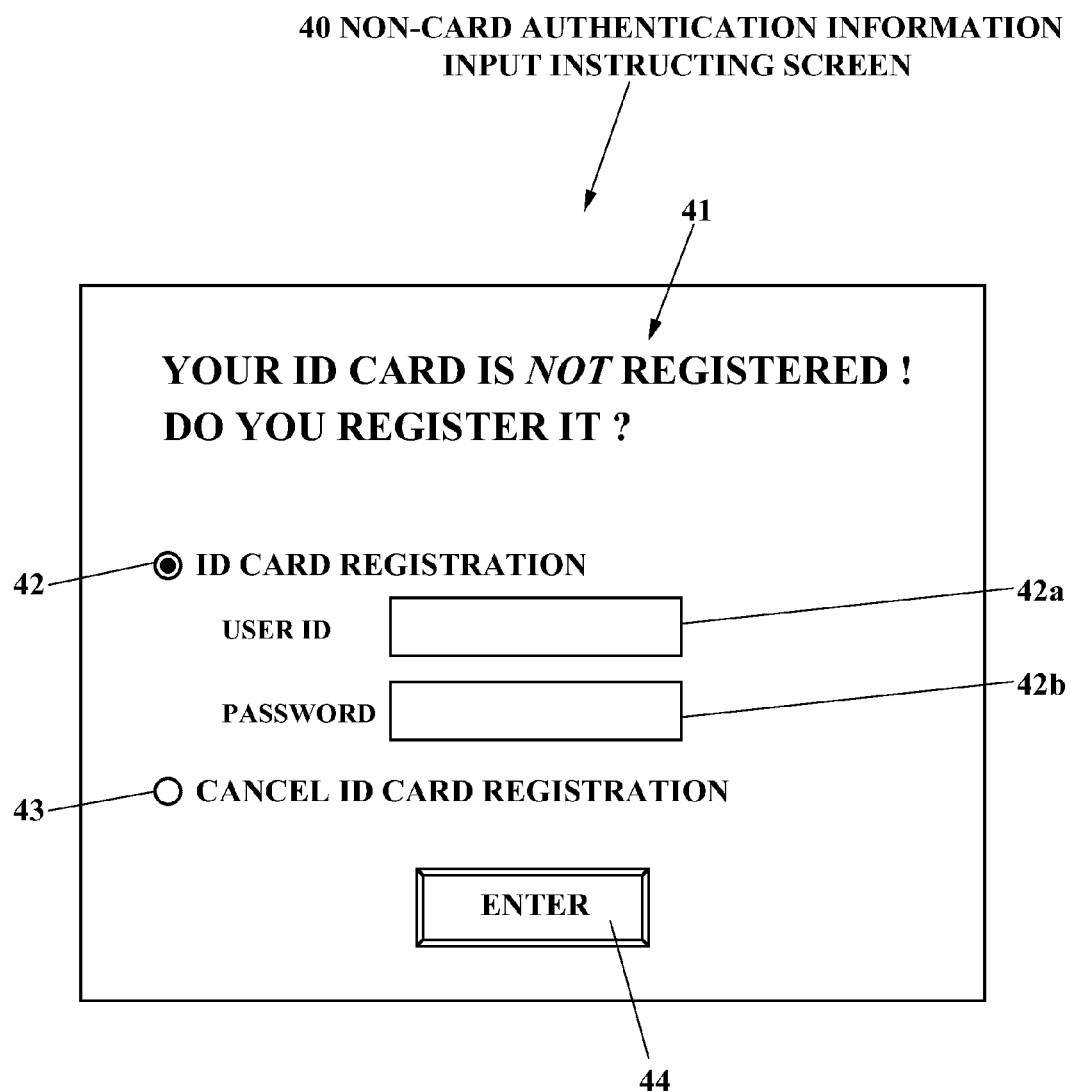
FIG. 8 is a schematic diagram illustrating an example of a non-card authentication information input instructing screen displayed on a display unit of the MFP.

FIG. 8 is a schematic diagram illustrating a non-card authentication information input instructing screen 40 displayed on the display device 22 to notify the user that the user is instructed to enter the non-card authentication information.

As illustrated in FIG. 8, the non-card authentication information input instructing screen 40 includes: i) a message 41 that asks the user whether to register the non-registered ID card; ii) a radio button 42 to have the user select the ID card registration; iii) a text box 42a into which the user enters the user ID required to register the ID card; iv) a text box 42b into which the user enters the password required to register the ID card; v) a radio button 43 to have the user cancel the ID card registration; and vi) an execution button 44 to execute process selected by the radio button 42 or radio button 43.

The radio button 42 and the radio button 43 are configured so that only one of them is always selected. When the radio button 42 is selected, but at least one of the text box 42a and text box 42b is blank, the execution button 44 is grayed out so that it is not selected.

If the user operates the operation device 21 to select the radio button 43 and also selects the execution button 44, the controller 29 in the MFP 20 turns off the non-card authentication information input instructing screen 40 and terminates the operation illustrated in FIG. 7.

If the user operates the operation device 21 to select the radio button 42, enters the user ID and the password into the text box 42a and text box 42b, respectively, and then selects the execution button 44, the registration requesting unit 29d in the MFP 20 transmits the combination of the user ID and the password entered into the text box 42a and text box 42b, respectively, that is, the non-card authentication information and the card registration request including the card ID that has been transmitted to the management server 30 in S141 to the management server 30, as illustrated in FIG. 7 (S145).

The card ID registering unit 35b in the management server 30 receives the card registration request, which has been transmitted from the MFP 20, and registers the card ID eligible for the card registration request (S146). If the non-card authentication information included in the card registration request has been registered in the user information 34b, the card ID registering unit 35b registers the card ID eligible for the card registration request in the user information 34b in correspondence to the user. If, for example, the user ID and the password in the non-card authentication information included in the card registration request is USER001 and 1234, respectively, and the user information 34b is as illustrated in FIG. 4, since the non-card authentication information included in the card registration request has been registered in the user information 34b in the storage device 34 in correspondence to the user having the user ID of USER001, the card ID registering unit 35b registers the card ID included in the card registration request in the user information 34b in correspondence to the user. If the non-card authentication information included in the card registration request has not been registered in the user information 34b in correspondence to the user, the card ID registering unit 35b decides that card ID registration has failed.

Next, the card ID registering unit 35b transmits the authentication result obtained in S146 via the network communication device 33 to the MFP 20 (S147). If registration in S146 has failed, the card ID registering unit 35b includes, in the authentication result, information indicating an unsuccessful card ID registration.

The controller 29 in the MFP 20 receives the authentication result transmitted from the management server 30 via the network communication device 26, and displays, on the display device 22, the registration result received from the management server 30 to notify the user (S148).

After that, therefore, the user can succeed in authentication by the ID card illustrated in FIG. 6.

According to this embodiment of the present disclosure, as above-described, if non-card authentication information on the user has been registered in correspondence to the user, the printing system 10 registers the card ID of the ID card in correspondence to the user, so the user using the MFP can easily register the ID card of the user. Therefore, the printing system 10 can be made ready for the authentication by the ID card in a shorter time than before.

With the printing system 10, the user using the MFP can register the ID card of the user, so the burden on the manager can also be reduced.

Since the printing system 10 can be made ready for authentication by the ID card in a shorter period of time than before, even if the ID card has not been issued to the user or the user has lost his or her ID card, a new ID card can be quickly made available to the user.

With the printing system 10, the MFP notifies the user of a task required to register the ID card as illustrated in FIG. 8, so convenience can be improved.

With the printing system 10, the user can use the non-card authentication information for registering the ID card not only for ID card registration (S145), but also for permission of the execution of MFP functions (S101), so the ID card can be registered with a simple configuration when compared with a configuration in which the non-card authentication information for registering the ID card and the non-card authentication information for permitting the execution MFP functions are separately provided.

While various aspects and embodiments have been disclosed herein, other aspects and embodiments are possible. Other designs may be used in which the above-described components are each present.

Although, in this embodiment, the printing system 10 is configured so that the ID card is registered by using the non-card authentication information that is the combination of the user ID and the password, the printing system 10 may be configured so that the ID card is registered by using the non-card authentication information that is not the combination of the user ID and the password. For example, the printing system 10 may be configured so that the ID card is registered by using the non-card authentication information that is fingerprint information used in a fingerprint authentication.

Although, in this embodiment, the printing system 10 has the MFP as the image forming apparatus in the present disclosure, the printing system 10 may have the image forming apparatus other than the MFP such as a printer machine, a copier machine, or a facsimile machine.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A printing system comprising:
an image forming apparatus and a management server that are connected via a network;
the image forming apparatus comprising:
a card reader that reads a card ID from an ID card of a user using the image forming apparatus,
a non-card authentication information accepting device that accepts non-card authentication information that includes a user ID that is identification information on the user and a password,
an authentication requesting unit that transmits an authentication request including the card ID of the user to the management server,
a registration requesting unit that transmits, to the management server, a card registration request including the user ID, the password, and the card ID that has been transmitted in the authentication request, if an unsuccessful authentication result that includes information indicating that the card ID has not been registered is transmitted from the management server, and
a function execution permitting unit that permits execution of a function under an authority, if a successful authentication result is transmitted from the management server,
the management server comprising:
a storage device that stores, for each user, user information that includes the user ID, the password, the card ID, and the authority for execution of the function of the image forming apparatus,
an authority registering unit that registers the authority in the user information,
an authentication executing unit that transmits (i) the successful authentication result and the authority to the image forming apparatus, if the card ID received from the image forming apparatus has been registered in the user information, and (ii) transmits the unsuccessful authentication result to the image forming apparatus, if the card ID has not been registered in the user information,
a non-card authentication information registering unit that registers the user ID and the password in the user information, and
a card ID registering unit that registers the card ID in the user information, if the user ID and the password included in the card registration request received from the image forming apparatus has been registered in the user information.

2. The printing system according to claim 1, wherein:
the image forming apparatus comprises an input instructing notification unit that transmits a notification to the user to enter the user ID and the password if the unsuccessful authentication result is transmitted from the management server; and the registration requesting unit transmits the card registration request to the management server after the input instructing notification unit has transmitted the notification.

3. A card ID registration method performed by a printing system including an image forming apparatus and a management server that are connected via a network, the method comprising:

via the image forming apparatus,
reading a card ID from an ID card of a user using the image forming apparatus;
accepting non-card authentication information that includes a user ID that is identification information on the user and a password;
transmitting from the image forming apparatus an authentication request including the card ID of the user to the management server;
transmitting from the image forming apparatus to the management server, a card registration request including the user ID, the password, and the card ID that has been transmitted in the authentication request, if an unsuccessful authentication result that includes information indicating that the card ID has not been registered is transmitted from the management server; and
permitting execution of a function under an authority, if a successful authentication result is transmitted from the management server;

via the management server,
storing, for each user, user information that includes the user ID, the password, the card ID, and the authority for execution of the function of the image forming apparatus;
registering the authority in the user information;
transmitting the successful authentication result and the authority from the management server to the image forming apparatus, if the card ID received from the image forming apparatus has been registered in the user information;
transmitting from the management server the unsuccessful authentication result to the image forming apparatus, if the card ID has not been registered in the user information;
registering the user ID and the password in the user information; and
registering the card ID included in the card registration request in the user information, if the user ID and the password included in the card registration request received from the image forming apparatus has been registered in the user information.

4. The card ID registration method according to claim 3, further comprising
via the image forming apparatus,
transmitting a notification to the user to enter the user ID and the password if the unsuccessful authentication result is transmitted from the management server; and
transmitting to the management server the card registration request after transmitting the notification.

* * * * *